April 5, 1932.   E. G. SIMPSON   1,852,905
DOORCHECK
Filed Dec. 28, 1929
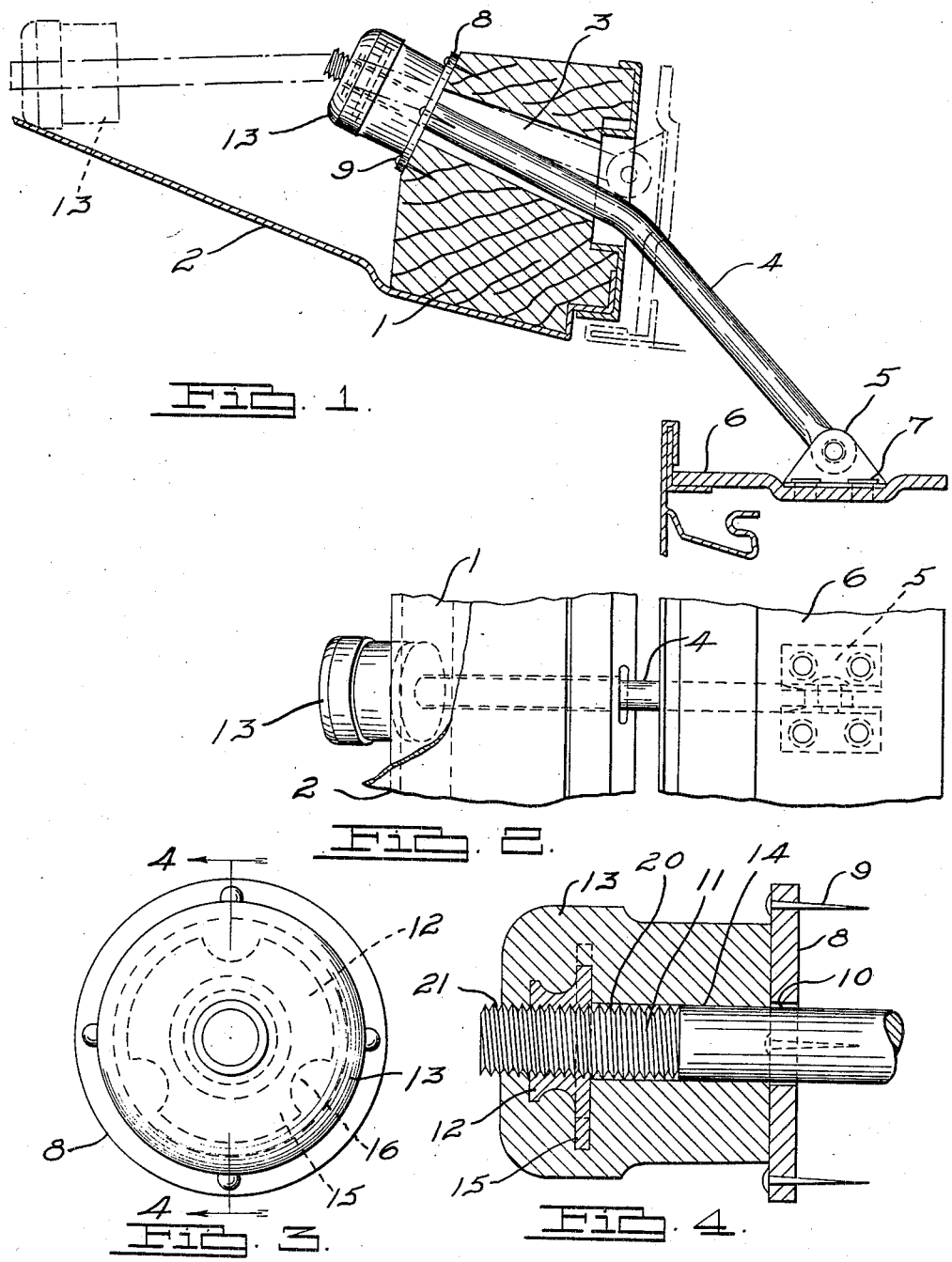
INVENTOR
Emory Glenn Simpson
BY
Stuart C Barnes
ATTORNEY Patented Apr. 5, 1932

1,852,905

UNITED STATES PATENT OFFICE

EMORY GLENN SIMPSON, OF DETROIT, MICHIGAN, ASSIGNOR TO TERNSTEDT MANUFACTURING COMPANY OF DETROIT, MICHIGAN, A CORPORATION OF MICHIGAN

DOORCHECK

Application filed December 28, 1929. Serial No. 417,061.

This invention relates to a door check primarily for automobiles.

This invention relates more particularly to that type of door check wherein the body pillar has an opening therethrough which is arranged to have passed therethrough a rod, one end of which is pivoted to the door hinge pillar and the other end of which carries a rubber block which abuts against the body hinge pillar at the inner end of the opening to arrest the outward movement of the door. Various means have been utilized for maintaining the rubber block upon the end of the rod.

It is the object of this invention to present a novel and simple means for adjustably maintaining the rubber blocking upon the end of the rod and this has been achieved by threading the free end of the rod and molding a nut in the rubber bumper which nut may be screwed upon the threaded end of the rod to hold the bumper in place.

In the drawings:

Fig. 1 is a section through the body pillar and door pillar showing the door check in the position it assumes when the door is opened.

Fig. 2 is a fragmentary elevation of the door bumper in the position shown in Fig. 1.

Fig. 3 is an end elevation of the bumper mounted on the rod.

Fig. 4 is a section along the line 4—4 of Fig. 3.

Referring more particularly to the drawings, the body pillar may be referenced 1 and the body panel 2. The body pillar has an opening 3 to provide a passageway for the door-check rod 4. The opening 3 in the body pillar 1 is somewhat larger in cross sectional area than the rod 4 to allow for the movement of the rod as the door is opened. The rod 4 is pivoted at one end to the bracket 5 which in turn is mounted upon the door pillar 6 by any suitable means such as the rivets 7.

To prevent chattering of the rod as the door is opened and closed, a washer 8 is mounted upon the body pillar 1 at the inner end of the opening 3. The washer 8 may be retained in position by any suitable means such as the nails 9. The washer 8 is preferably composed of rubber impregnated with fiber and a suitable lubricant such as graphite. The fiber in the washer is used to give the washer wearing qualities and the lubricant in turn diminishes wear on the washer. The washer has an aperture 10 that has a slightly larger diameter than the diameter of the rod 4. The rod 4 is arranged to project through the opening 10 in the washer 8. The washer 8 is so mounted upon the body pillar 1 that the opening 10 therein is located substantially centrally of the inner end of the opening 3. Hence, the rod 4 slidably engages the washer 8 in the opening 10 and therefore is maintained in spaced relation with the sides of the opening 3.

The free end of the rod 4 is threaded as at 11 and carries thereon the nut 12. The nut 12 is molded in the rubber bumper 13 so that it is firmly held in place. The rubber bumper 13 is provided with a suitable opening 14. The portion of the opening 14 in front of the nut 12, as at 20, is of the same diameter as the outer diameter of the threaded end of the rod, while the portion of the opening 14 to the rear of the nut 12, as at 21, is appreciably smaller in diameter than the outer diameter of the threaded end of the rod. Hence, when the rubber block 13 with its molded-in nut 12 is turned onto the threaded end of the rod 4, the rubber block will yieldably engage the threaded end of the rod 4 as at 21. This yieldable engagement between the end of the rod and the block 13 is just sufficient to maintain the block from turning relative to the rod 4 owing to the vibration set up when the vehicle body is in motion. The yielding engagement is light enough to permit the block and molded-in nut to be readily turned onto the end of the rod 4.

Since the rubber block 13 is arranged to abut against the body pillar 1 to arrest the outward movement of the door it necessarily follows that it is subjected to rather heavy stresses at times. Hence, to properly secure the nut 12 in the block 13, the nut 12 is provided with a suitable annulus 15 which is recessed as at 16 to better hold it in the rubber. The annular flange 15 insures the nut against being torn out of the rubber block 13 when the block 13 is subjected to the normal stresses and strains of use.

As shown in the full lines (Fig. 1) the door is in open position in which case the outward movement of the door is arrested by the bumper 13 which abuts against the washer 8 mounted upon the body pillar 1. The relative position of the door pillar, body pillar, and the door-check, when the door is closed, is shown in the dotted lines (Fig. 1).

It is evident from the above description that there is here produced a bumper for a door-check which is very simply, durably, and adjustably mounted upon the end of the door-check rod by having the means which secures the bumper to the rod and which is preferably a nut, molded directly in the rubber bumper.

What I claim is:

In a door check for an automotive vehicle having one end arranged to be pivotally mounted to the door pillar and the other end threaded and arranged to be projected through an opening in the adjacent body pillar, the combination of a rubber bumper having an opening therein, a part of which is slightly smaller in diameter than the diameter of the threaded end of the rod, a nut molded in the said rubber block with the threaded opening coinciding with the opening in the rubber block whereby the nut may be turned onto the threaded end of the rod so that the rubber block yieldably engages the threaded end of the rod to prevent relative rotation between the block and the rod owing to vehicle vibrations.

In testimony whereof I affix my signature.

EMORY GLENN SIMPSON.